United States Patent
Cannon et al.

(10) Patent No.: US 6,654,828 B2
(45) Date of Patent: Nov. 25, 2003

(54) PERSONALIZED AUTOMATED OPERATOR POSITION

(75) Inventors: Dale E. Cannon, Palm Bay, FL (US); Andrew F. Connor, Melbourne, FL (US); Bruce A. Corbin, Indialantic, FL (US); Kerry L. Starr, Palm Bay, FL (US); Mark M. Adamo, West Melbourne, FL (US)

(73) Assignee: Golden Voice Technology and Training LLC, Melbourne, FL (US)

(*) Notice: Subject to any disclaimer, the term of this patent is extended or adjusted under 35 U.S.C. 154(b) by 0 days.

(21) Appl. No.: 10/244,364

(22) Filed: Sep. 16, 2002

(65) Prior Publication Data

US 2003/0014567 A1 Jan. 16, 2003

Related U.S. Application Data

(63) Continuation of application No. 09/297,170, filed as application No. PCT/US97/20187 on Nov. 3, 1997, now abandoned.
(60) Provisional application No. 60/029,918, filed on Nov. 1, 1996, provisional application No. 60/053,290, filed on Jul. 21, 1997, and provisional application No. 60/059,386, filed on Sep. 19, 1997.

(51) Int. Cl.[7] .............................................. G06F 3/06
(52) U.S. Cl. ........................ 710/62; 345/168; 379/67; 379/223
(58) Field of Search ........................... 345/168; 379/67, 379/213, 223, 230; 710/62

(56) References Cited

U.S. PATENT DOCUMENTS

| | | | |
|---|---|---|---|
| 4,087,151 A | 5/1978 | Robert et al. | |
| 4,847,711 A | 7/1989 | Inove | 369/72 |
| 4,873,614 A | 10/1989 | Lichtensperger | |
| 5,157,718 A | 10/1992 | Kaplan et al. | 379/218 |
| 5,442,693 A | 8/1995 | Hays et al. | 379/308 |
| 5,475,548 A | 12/1995 | Rudi et al. | 361/220 |
| 5,494,451 A | 2/1996 | Bowers | 439/328 |
| 5,613,882 A | 3/1997 | Hnatuck et al. | 439/686 |
| 5,659,459 A | 8/1997 | Wakabayashi et al. | 361/753 |
| 5,726,821 A | 3/1998 | Cloke et al. | 360/25 |
| 5,800,198 A | 9/1998 | Morlion | 439/372 |
| 5,828,804 A | 10/1998 | Akins | 385/58 |
| 5,980,324 A | 11/1999 | Berg et al. | 439/630 |
| 6,102,747 A | 8/2000 | Paagman | 439/701 |
| 6,272,126 B1 | 8/2001 | Strauss et al. | 370/352 |
| 6,295,342 B1 | 9/2001 | Kaminsky | 349/88.23 |
| 6,304,436 B1 | 10/2001 | Branch et al. | 361/683 |

Primary Examiner—Jeffrey Gaffin
Assistant Examiner—Harold Kim
(74) Attorney, Agent, or Firm—Allen, Dyer, Doppelt, Milbrath & Gilchrist, P.A.

(57) ABSTRACT

A telephone operator signal analysis and manipulation subsystem (50) is configured to be interfaced with various signal transport paths of input/output devices of the operator's (personal computer-based) workstation (12). The subsystem is operative to intercept, analyze and selectively modify signals distributed among components of the workstation, including those that may prompt an interactive response from the operator, so as to alleviate the workload of the operator, and improve the efficiency and response time of the operator position. Because the subsystem analyzes and operates only on information that is presented to and sourced from the operator, it is able to automate various functions of the operator position, including initiating the generation of personalized audio messages, without knowledge of the communication protocol of the telecommunication switch to which the operator's workstation is coupled.

19 Claims, 3 Drawing Sheets

PERSONALIZED AUTOMATED OPERATOR POSITION

CROSS-REFERENCE TO RELATED APPLICATIONS

This is a continuation of application Ser. No. 09/297,170 filed Apr. 27, 1999 now abandoned.

The present application claims the benefit of previously filed U.S. provisional patent applications: Ser. No. 60/029,918, filed Nov. 1, 1996; 60/053,290, filed Jul. 21, 1997; and 60/059,386, filed Sep. 19, 1997, and International Application No. PCT/US97/20187, (WO 98/20409), filed Nov. 3, 1997.

FIELD OF THE INVENTION

The present invention relates in general to communication systems, and is particularly directed to a signal analysis and manipulation subsystem, that is configured to be interfaced with various signal transport paths of input/output devices of a telephone operator's (personal computer-based) workstation. The inventive subsystem is operative to intercept, analyze and selectively modify signals being distributed among components of the workstation, including those that may prompt an interactive response from the operator, so as to alleviate the workload of the operator, and improve the efficiency and response time of the operator position. Advantageously, the inventive subsystem is operative to automate various functions of the operator position, including initiating the generation of personalized audio messages, without requiring knowledge of the communication protocol of a telecommunication switch to which the operator's workstation is coupled.

BACKGROUND OF THE INVENTION

Since the advent of the personal computer (PC), the users of many industrial and utility systems have sought to reduce the complexity and vendor-dependency of conventional 'customized' signal processing schemes, by replacing such schemes with 'open' architectures that are capable of being interfaced with a variety of input/output units, signal communication paths, auxiliary function processors (external to a user's workstation) and databases, and thereby provide increased flexibility and performance. Unfortunately, this objective is often thwarted by the equipment vendors who place restrictions on the contents and/or use of their (proprietary) communication protocols. In addition, once they have been configured to accommodate a switch vendor's communication control software, personal computer-based operator positions often have very limited, if any, auxiliary card slot availability.

Moreover, manufacturers of telecommunication switches, such as those installable in the central office of a telephone service provider, have effectively prevented customers from either developing their own or obtaining third party vendor upgrades to add auxiliary functionality, by either refusing to reveal or requiring a license to access or use their proprietary signaling protocols. Often, the financial burden imposed on the licensee is so financially egregious that the customer is either forced to use a (less than desirable) product offered by the licensor (if one is even available), or to simply forego the improvement, which leaves the end user—the telephone subscriber—without the benefit of the add-on or upgrade.

Indeed, the lack of or restricted access to signaling protocols by telecommunication switch manufacturers has effectively frustrated telephone service providers from furnishing a variety of improved customer information services, that could otherwise be provided, by automated access to information (e.g., directory assistance) databases available from third party sources. On the one hand, an automated data base search and retrieval system enables the telephone service provider to reduce access time by either eliminating or decreasing the amount of operator interaction with a calling subscriber. On the other hand, automated access to the data base ostensibly requires the ability to understand and thereby make practical use of the switch communication protocols—something the switch manufacturers are effectively unwilling to share. It may be inferred that this refusal is due to the fact that one or more switch vendors have or are in the process of developing their own databases, and they apparently wish to control and monopolize, to the extent possible, sales and use of such auxiliary resources.

SUMMARY OF THE INVENTION

In accordance with the present invention, this communication protocol access problem is effectively solved by means of an auxiliary signal processing interface that is ported to readily accessible signal transport paths of input/output devices of a telephone operator's personal computer-based workstation. This auxiliary signal processing interface is operative to intercept, analyze and selectively modify signals that are transported between input/output components and the data processing unit of the workstation. Because it is coupled to each of the operator's display, keyboard and an auxiliary audio messaging unit, the auxiliary processing interface of the invention has the ability to simulate input/output operations that would normally be manually conducted by the operator. As the operator is not required to, and normally does not, have knowledge of the telecommunication switch's proprietary communication signaling protocol, neither does the auxiliary processing interface. The operation of the interface is instead based upon what the operator would normally see and do.

A typical telephone operator position in which the auxiliary signal processing interface of the present invention may be installed comprises a computer based workstation, having a data processing unit, and one or more input/output devices, such as a mouse, keyboard, hand-held wand, video display device and the like. The data processing unit may include an audio path/device connected to an operator's headset, and a digital communication port connected to a central office telecommunication switch, whose associated communication protocols is not readily available from the switch manufacturer.

The auxiliary signal processing interface has a video port coupled to the display monitor's communication cable, so that video display control signals produced by the data processing unit for generating alpha-numeric text, mnemonics, icons and the like on the operator's video monitor may be read directly by the auxiliary signal processing interface. It also has a keyboard port for selectively buffering, modifying and passing keyboard signals to the data processing unit.

A video and keyboard signal processing interface circuit, to which video and keyboard ports are coupled, processes signals representative of the contents of video information displayed on the operator's workstation video monitor and signals that are representative of the operation keys of the workstation keyboard, and controllably initiates the generation of a synthesized voice message by an auxiliary audio messaging unit.

The auxiliary audio messaging unit, which may be installed either internally or externally of the interface, has an audio port coupled to the operator's headset to an audio port of the data processing unit. The auxiliary audio messaging unit is controllably operative to output to a calling party one or more synthesized voice messages or phrases, that are 'personalized' in the voice of the operator serving at the operator position, in accordance with control signals supplied to its control port.

The auxiliary signal processing interface further includes a digital communications port which is coupled via a digital communication path to an ancillary data base such as a telephone subscriber information data base, from which telephone subscriber information, such as directory assistance telephone subscriber information, may be retrieved for delivery to a calling party.

The video and keyboard signal processing interface circuit comprises a video signal processing section and a keyboard signal processing section, each of which is coupled to an operator emulation control processor. The video signal processing section is coupled to the interface circuit's video input port and has a video trigger output port coupled to a video signal input port of the operator emulation control processor. The keyboard signal processing section is coupled to the interface's keyboard port and has a keyboard trigger signal port coupled to a keyboard signal input port of the operator emulation control processor.

A further keystroke transmission control link is coupled between the operator emulation processor and the keyboard signal processing unit and conveys keyboard control signals from the keyboard signal processing section that are used to selectively control the transmission of invoked keystroke signals to the data processing unit, in accordance with analysis of keystroke and video frame data carried out by the operator emulation processor. The processor is operative to couple control signals to the auxiliary audio messaging unit in accordance with the processing of signals representative of the contents of video information displayed on the operator's workstation video monitor, and signals representative of the operation of keys of the workstation keyboard.

The video signal processing section includes an analog-to-digital converter and a video sync pulse detector circuit, that are coupled to receive video signals representative of the sequential scanning of the respective pixels of the video monitor of the operator's workstation. Digitized video (pixel) data is supplied to a video frame memory, the contents of which are coupled to a video signal analysis microprocessor, which is operative to analyze the contents of a captured frame of video data, as it is displayed to the operator by the workstation's video display.

The video analysis routine executed by the video signal analysis processor is based upon a priori knowledge of various messages/prompts that are displayable by the workstation's monitor, and in response to which the operator emulation control processor initiates one or more operations that automate manual operations that the operator would normally interactively execute. When a frame of displayed data is captured, the video signal processor examines all or any selected portion of the video information displayed to the operator, so as to facilitate the ability of operator emulation control processor to automate the operator's response based upon this analysis. The video analysis carried out by processor is preferably conducted by the execution of a video pattern recognition algorithm. Such an algorithm may comprise, but is not limited to, an optical character recognition algorithm for recognizing or detecting pixel pattern characteristics, icons or other video information, by comparing digitized video data stored in memory with one or more data templates associated with prescribed operator position actions. The results of the video pattern recognition routine are then forwarded to the operator emulation control processor.

For the case of a programmable keyboard, a first section of the keyboard cable is coupled to a common terminal of a first relay controlled switch and via an opto-coupler to a keyboard signal microprocessor. A second section of the keyboard cable from the data processing unit is coupled to a common terminal of a second relay controlled switch and via a buffer amplifier and an opto-coupler to the keyboard microprocessor. In the default or passive mode of the relay controlled switches, keystroke signals from the operator's keyboard are passed directly to the data processing unit of the workstation. In the active mode, the relay winding is driven from the keyboard microprocessor to place places the microprocessor in a communication path between the keyboard and the data processing unit. In this active mode, the microprocessor is able to reprogram the keys of the keyboard or to modify or control keystroke signals supplied to the data processing unit.

In the course of operation, a response initiated by an operator will be dependent upon digits dialed by an accessing party. In the case of an "0+" toll call, for example, a greeting phrase spoken by the operator will typically be different from the phrase given for another type of call. Since the call type indication is customarily displayed to the operator at a prescribed spatial region of the graphics user interface displayed by the workstation display monitor, the video signal analysis (pattern recognition) routine need only analyze the contents of that portion of the frame memory associated with the displayed spatial region of interest.

Should it be necessary that a call directed to one operator position be forwarded to another workstation, the intercepting workstation operator must normally become an interactive participant in the call forwarding process—first, by reading the displayed call information displayed, and then keying-in that information into the workstation's data processing unit. Not only is additional time involved, but there is potential for human error in reading and entering the displayed information. The ability of the interface of the invention to read the displayed video information allows operator actions that are dependent upon the contents of the displayed information to be automated and without the introduction of errors into the process.

The video analysis processor generates an output code representative of its analysis of the captured frame of video data, and forwards this information to the operator emulation control processor, which then processes this video analysis information and any keystroke information supplied by the operator, for the purpose of emulating the operator's response. The emulated response may include the artificial invoking of one or more keystroke-representative signals to the workstation's data processing unit or the generation of a prescribed vocalized message by the auxiliary audio messaging unit.

Where the automated operator response includes invoking one or more keystrokes, the operator emulation processor couples output signals to the keyboard signal processing unit, to selectively control the transmission of invoked keystroke signals to the data processing unit, in accordance with the analysis of keystroke and video frame data carried out by the operator emulation processor. Where the response is to invoke the generation of a prescribed personalized phrase by auxiliary audio messaging unit, the emulation control processor couples an output signal to the control port of the auxiliary audio messaging unit, so that the selected greeting phrase will be synthetically vocalized to the calling party.

The ability of the auxiliary signal processing interface to control the coupling of keystrokes from the operator's keyboard to the data processing unit is particularly useful when a call is released, as it reduces operator workload and efficiently handles release of the call. Normal release of the call may be initiated by the operator depressing a call release key on the workstation keyboard. Prior to releasing the call, the operator may either personally speak a "thank you" type phrase to the customer, or manually trigger the auxiliary audio messaging unit to synthetically vocalize the phrase. When the operator has either finished speaking or has listened to the completion of the voicing of the phrase by the auxiliary audio messaging unit, the operator then hits the release key on the workstation keyboard, releasing the call. Automatic release may occur should the operator desire to reject calls from a certain source as determined by on-screen indication of calling number, trunk number, calling location or incoming local phone number, for example.

The interface circuit of the present invention enables a release operation that employs a synthesized message generated by the auxiliary audio messaging unit to be efficiently executed by the depression of only the release key. Alternatively, a totally automated release operation in which a message is synthesized by the auxiliary audio messaging unit may be executed without any operator intervention.

Upon release of a call, since keystrokes from the keyboard are intercepted by the keyboard signal processor, the processor has the ability to controllably delay and modify the contents of the keystrokes. When the release key is invoked, the operator emulation processor triggers the operation of the auxiliary messaging unit to vocalize the release phrase, and causes the keyboard processor to temporarily buffer the release keystroke signal, until it sees a message termination signal sent from the messaging unit upon completion of the phrase. Once the message termination signal has been detected by the operator emulation processor, it signals the keyboard processor to pass the buffered 'release' key signal to the data processing unit, so that the call may be released by the switch.

A fully automated release operation may be initiated in response to a change in state of the incoming call present information displayed by the workstation monitor. When the call information disappears, the video pattern recognition routine executed by the video processor signals the operator emulation processor, indicating that the call has been dropped. In response to this recognition, the operator emulation processor signals the keyboard signal processor to generate a pseudo keystroke, which is then transmitted to the workstation processing unit, so that the call may be released by the switch.

DETAILED DESCRIPTION

Figure 1:
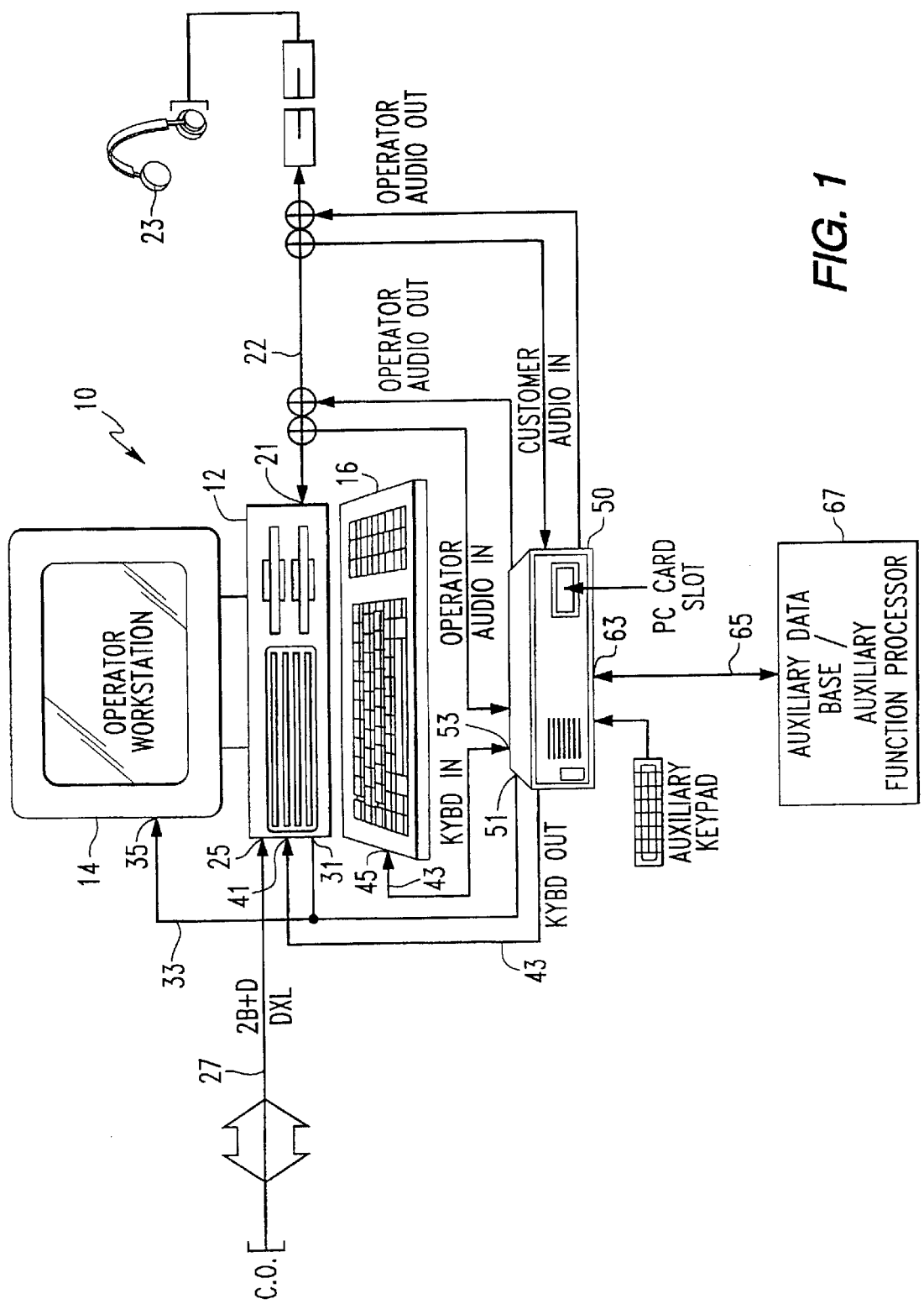
FIG. 1 diagrammatically illustrates a personal computer-based telephone operator position that is automated by means of the auxiliary signal processing interface of the present invention.

Before describing in detail the personalized automated operator position of the present invention, it should be observed that the invention resides primarily in what is effectively a prescribed arrangement of conventional communication circuits and associated digital signal processing components and an attendant supervisory control program therefor, that controls the operations of such circuits and components. Consequently, the configuration of such circuits and components and the manner in which they are interfaced with other communication system equipment have, for the most part, been illustrated in the drawings by readily understandable block diagrams, which show only those specific details that are pertinent to the present invention, so as not to obscure the disclosure with details which will be readily apparent to those skilled in the art having the benefit of the description herein. Thus, the block diagram illustration and associated flow charts of the automated operator position to be described are primarily intended to show the major components of the system in a convenient functional grouping and processing sequence, whereby the present invention may be more readily understood.

A personal computer-based telephone operator position, that is automated and personalized by means of an auxiliary signal processing interface in accordance with the present invention, is diagrammatically illustrated in FIG. 1 as comprising an operator workstation 10 (such as but not limited to a directory assistance workstation). The operator's workstation is comprised of a data processing unit 12, and one or more input/output devices (such as a mouse, keyboard, hand-held wand, video display device and the like, as non-limiting examples). For purposes of providing a reduced complexity example, the input/output devices of the workstation 10 are shown as comprising a video display device (monochromatic or color monitor) 14 and a (fixed or programmable) keyboard 16.

The data processing unit 12 includes an audio port 21, to which an audio cable 22 of an operator's headset 23 is connected, and a digital communication port 25 which is connected via a digital communication link 27 to a (central office) telecommunication switch (not shown). As a non-limiting example, the telecommunication switch may comprise any one of an AT&T 5ESS custom switch, a Northern Telecom DMS-100 custom switch, a Siemens 5WSD switch, or National ISDN firmware-customized versions of the 5ESS and DMS-100 switches. The protocol of each of these respectively different switches has its own characteristic format which, as noted previously, is not readily available from the switch manufacturer.

The workstation's data processing unit 12 further includes a video display port 31, which is coupled via a display monitor cable 33 to a video input port 35 of the video display device 14. In addition, a keyboard port 41 is coupled via a keyboard cable 43 to a communication port 45 of the keyboard 16. While not essential to the present invention, in order to provide for enhanced operator workstation configuration flexibility, keyboard 16 may comprise an intelligent or programmable keyboard, that allows for reconfiguration of the functions (reprogrammability) of the keys of the keyboard. When such a reprogrammable keyboard is employed, keyboard cable 43 serves as a bidirectional link; where the keyboard 16 is a conventional, non-reprogrammable device, keyboard cable 43 serves to convey keystroke signals as invoked by a workstation operator from the keyboard 16 to the data processing unit 12.

In order to automate functions that conventionally require interactive operator participation, particularly where knowledge of the switch communication protocol is unavailable, in accordance with the invention, the computer-based workstation of FIG. 1 further includes an auxiliary signal processing interface 50 (to be described below with reference to FIGS. 2–5). As pointed out above, this inventive, auxiliary signal processing interface is operative to intercept, analyze and selectively modify signals distributed among various input/output devices of the operator's workstation, and does so without requiring access to or knowledge of the (proprietary) protocol of communication signals conveyed between the (central office) switch and the resident communication control software installed in the operator's workstation. Namely, rather than requiring knowledge of the (proprietary) protocol of the communication signals conveyed from the switch, the invention treats these signals as don't cares and looks instead to what these signals produce to the operator or receive as operator-controlled inputs.

For this purpose, the inventive auxiliary signal processing interface 50 has a video port 51 and one or more keyboard ports 53. Video port 51 is coupled to the display monitor cable 33, so that video display control signals, that are produced by the data processing unit 12 for generating alpha-numeric text, mnemonics, icons and the like on the operator's video monitor 14, may be read directly by the auxiliary signal processing interface 50.

Figure 2:
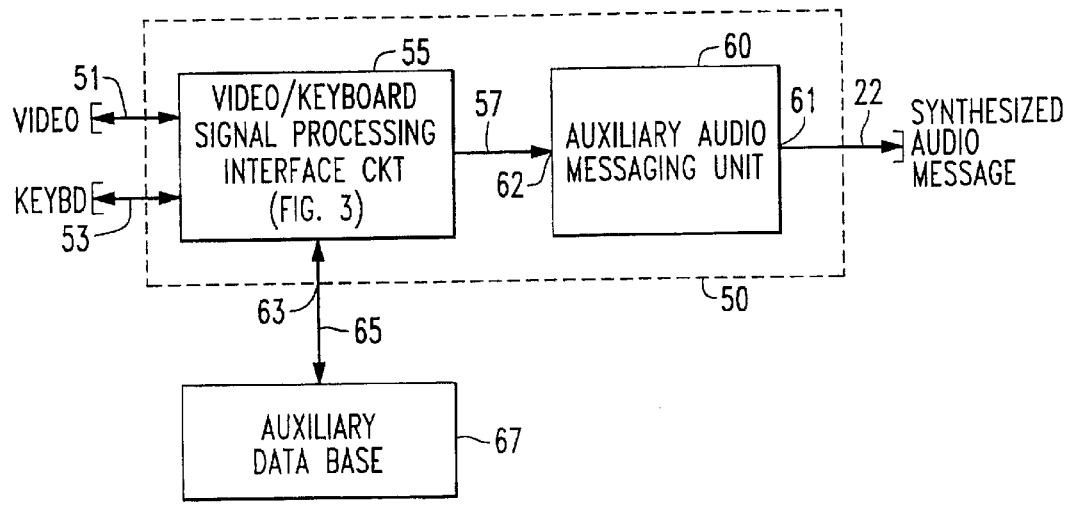
FIG. 2 diagrammatically shows a video and keyboard signal processing interface circuit and associated audio messaging unit of the auxiliary signal processing interface of FIG. 1.

As shown diagrammatically in FIG. 2, the signal processing interface 50 includes a video and keyboard signal processing interface circuit 55, to which video and keyboard signalling ports 51 and 53 are coupled. As will be described, interface circuit 55 is operative to process signals representative of the contents of video information displayed on the operator's workstation video monitor 14, and signals representative of the operation of one or more keys of the workstation keyboard 16, and controllably initiates the generation of a synthesized voice message by an auxiliary audio messaging unit 60.

For this purpose, interface circuit 55 is also coupled via an audio response trigger link 57 to the control port 62 of auxiliary audio messaging unit 60, which may be installed either internally or externally of the interface 50. In the illustrated embodiment, the auxiliary audio messaging unit 60 is installed internally of the signal processing interface 50. Auxiliary audio messaging unit 60 has an audio port 61, which is configured to be coupled to the audio cable 22 (to which the operator's headset 23 and audio port 21 of the data processing unit 12 are coupled).

Auxiliary audio messaging unit 60 is controllably operative to output to a calling party one or more synthesized voice messages or phrases, that may be 'personalized' in the voice of the operator serving at the operator position, in accordance with control signals supplied over audio response trigger link 57 to its control port 62. As a non-limiting example, the auxiliary audio messaging unit 60 may comprise circuitry of the type described in the U.S. Pat. No. 4,623,761 to Winter el al.

The auxiliary signal processing interface 50 further includes a digital communications port 63, which is coupled via a bidirectional digital communication path 65 to an ancillary data base or auxiliary function processor 67, such as a telephone subscriber information data base, from which telephone subscriber information, for example, directory assistance telephone subscriber information, may be retrieved for delivery to a calling party.

Figure 3:
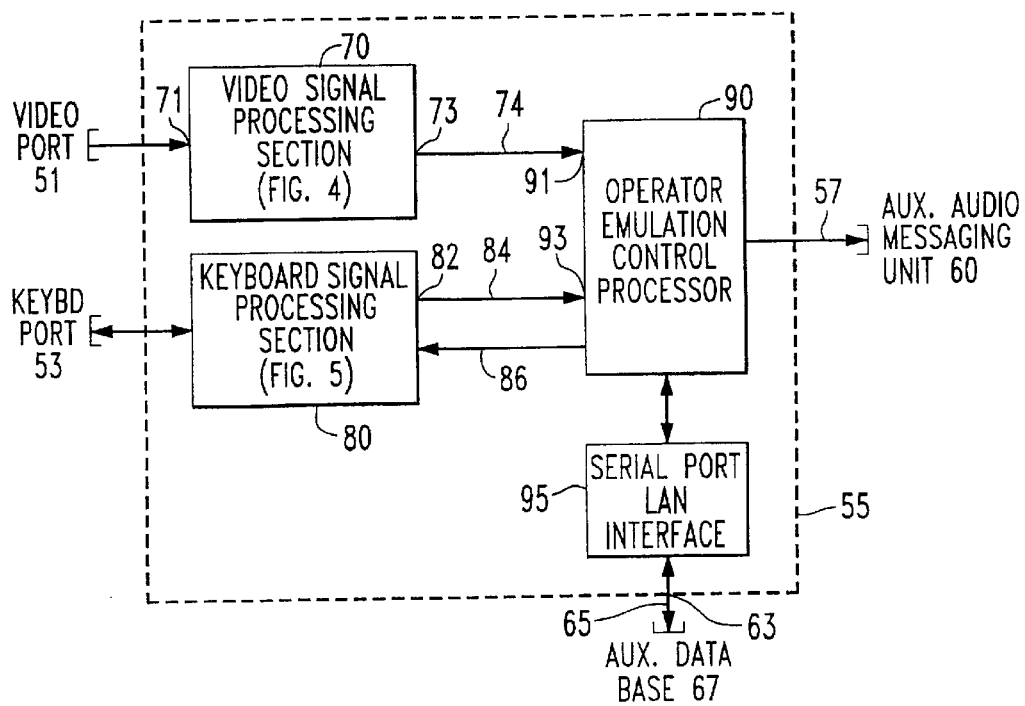
FIG. 3 diagrammatically illustrates the architecture of the video and keyboard signal processing interface circuit of FIG. 2.

Referring now to FIG. 3, the video and keyboard signal processing interface circuit 55 is diagrammatically illustrated as comprising a video signal processing section 70 (shown in detail in FIG. 4, to be described), and a keyboard signal processing section 80, each of which is coupled to an operator emulation control processor 90. The video signal processing section 70 has its input 71 coupled to video input port 51 and has a video trigger output port 73 coupled over a video trigger link 74 to a video signal input port 91 of the operator emulation control processor 90. The keyboard signal processing section 80 is coupled to the keyboard port 53 and has a keyboard trigger signal port 82 coupled via link 84 to a keyboard signal input port 93 of processor 90.

A further keystroke transmission control link 86 is coupled between processor 90 and the keyboard signal processing unit 80, and serves to convey keyboard control signals from the keyboard signal processing section 80 that are used to selectively control the transmission of invoked keystroke signals to the data processing unit 12, in accordance with analysis of keystroke and video frame data carried out by processor 90. Processor 90 is further coupled to the audio response trigger link 57 for conveying control signals supplied over audio response trigger link 57 to the control port 62 of the auxiliary audio messaging unit 60, in accordance with the processing of signals representative of the contents of video information displayed on the operator's workstation video monitor 14, and signals representative of the operation of one or more keys of the workstation keyboard 16.

Figure 4:
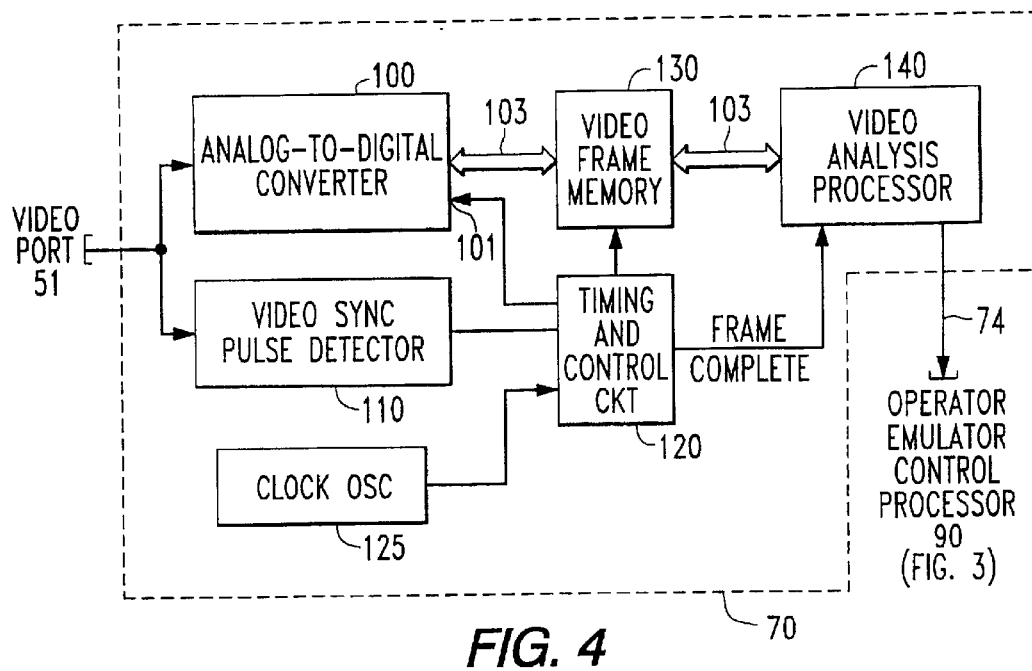
FIG. 4 diagrammatically shows the architecture of the video signal processing section of FIG. 3.

Referring now to FIG. 4, the video signal processing section 70 is diagrammatically illustrated as comprising an analog-to-digital converter (ADC) 100 and a video sync pulse detector circuit 110, to each of which the video input port 51 of the auxiliary signal processing interface 50 is coupled. Video input port 51 is coupled to receive video signals representative of the sequential scanning of the respective pixels of the video monitor 14 of the operator's workstation. For purposes of providing an illustrative example, the image displayed by (a color) monitor 14 will be considered to be a monochromatic (typically black and white) presentation, so that signals associated with any of the red, green and blue pixels of the pixels triads of the video monitor may be used. Where the operator position employs a full color presentation of the data, the circuitry of FIG. 4 may be expanded to process the video signals associated each of the red, green and blue pixels.

Under the control of a video frame start or trigger signal applied to its control port 101 from a video scan timing and control circuit chip 120, which is clocked by a video processing clock circuit 125, ADC 100 is operative to digitize the analog video (pixel) data. Video scan timing and control circuit chip 120 is operative to supply frame capture timing synchronization signals to a video frame memory 130, shown as a dual port random access memory (RAM), and a video signal analysis processor 140 in a conventional manner.

In response to detection of the video frame scan sync pulse by video sync pulse detector circuit 110, scanned video pixel representative signals supplied to video input port 51 are sequentially digitized and coupled over a digital data bus 103 for storage in dual port RAM 130. The video data bus 103 is also coupled to the video signal analysis processor 140, which is operative to analyze the contents of a captured frame of video data, as it is displayed to the operator by the workstation's video display 14.

More particularly, as described above, the video analysis routine executed by video signal analysis processor 140 is based upon a priori knowledge of various messages/prompts that are displayable by the workstation's monitor 14, and in response to which operator emulation control processor 90 initiates one or more operations that automate manual operations that the operator would normally interactively execute, such as, but not limited to the point and click of a mouse on a graphics user interface, the depression of one or more keys on the keyboard 16, or speaking/vocalizing of a response message into the audio path via the operator's headset.

For this purpose, since an entire frame of displayed data is captured in RAM 130, the video signal processor 140 has the ability to examine or analyze all or any selected portion of the video information displayed to the operator, so as to facilitate the ability of operator emulation control processor 90 to automate the operator's response based upon this analysis. Video analysis carried out by processor 140 is preferably conducted by the execution of a video pattern recognition algorithm that compares digitized video data stored in RAM 130 with one or more data templates associated with prescribed operator position actions. The results of the video pattern recognition routine are then forwarded via video trigger link 74 to the video signal input port 91 of operator emulation control processor 90.

Figure 5:
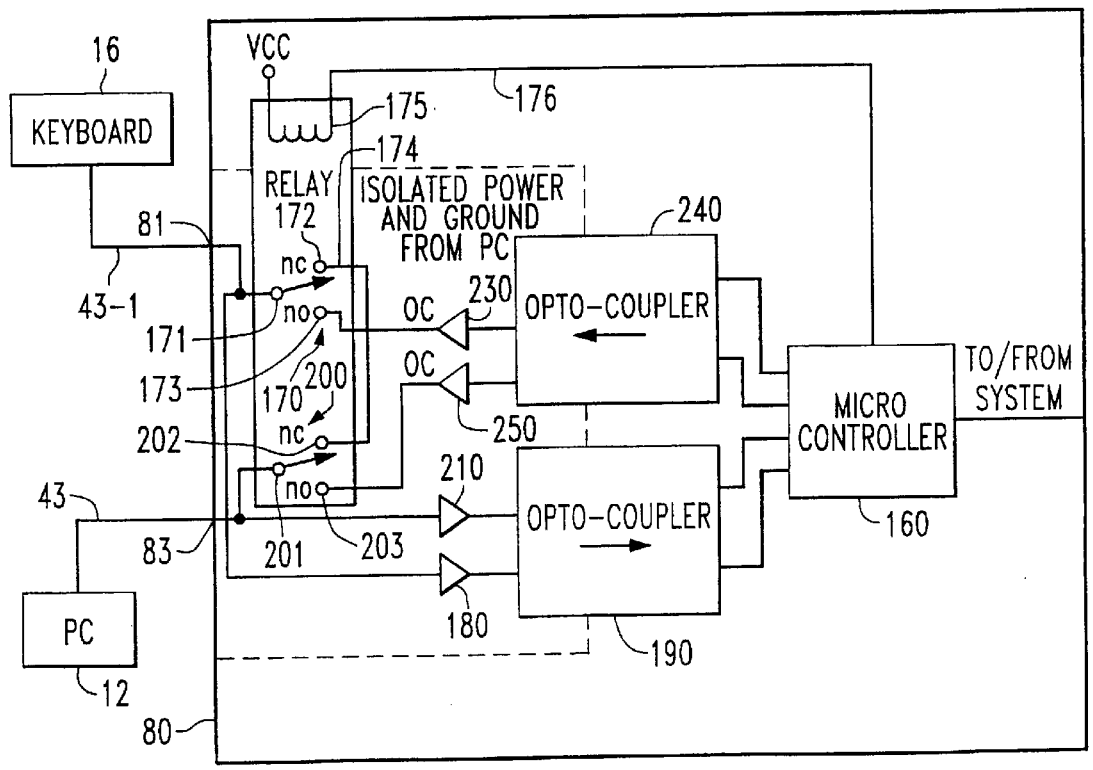
FIG. 5 diagrammatically illustrates the architecture of the keyboard signal processing unit of FIG. 3.

The keyboard signal processing unit 80 is diagrammatically illustrated in FIG. 5. As shown therein, for the case of keyboard 16 being a programmable keyboard, a first section 43-1 of the keyboard cable 43 from the keyboard 16 is coupled via a first bidirectional port 81 to a common terminal 171 of a first relay controlled switch 170, and via a buffer amplifier 180 and opto-coupler 190 to a microprocessor 160. A second section 43-2 of the keyboard cable 43 from the data processing unit 12 is coupled via a second bidirectional port 83 to a common terminal 201 of a second relay controlled switch 200, and via a buffer amplifier 210 and opto-coupler 190 to microprocessor 160.

FIG. 5 shows the (default) passive mode of the relay controlled switches 170 and 200, in which a relay winding 175 is deactivated or reset. To invoke the active mode, relay winding 175 is driven by a link 176 from microprocessor 160, which places the microprocessor 160 in a communication path between the keyboard 16 and data processing unit 12. In active mode, the microprocessor is able to reprogram the keys of the keyboard 16, per se, or to modify or control the keystroke signals being supplied to the data processing unit 12.

For this purpose, the first relay controlled switch 170 has a normally closed contact 172 coupled via link 174 to a normally closed contact 202 of the second relay -controlled switch 200. A normally open contact 173 of the first relay controlled switch 170 is coupled to the output of an opto-coupler output driver 230, which is coupled via an opto-coupler unit 240 to microprocessor 160. Similarly, the second relay controlled switch 200 has a normally open contact 203 coupled to the output of an opto-coupler output driver 250, which is coupled via opto-coupler unit 240 to microprocessor 160.

Through controlled switches 170 and 200 and microprocessor 160, the keyboard signal processing unit 80 has the ability to modify/control keystroke signals generated by the operator invoking keys on the workstation keyboard 16, or to independently generate keystroke signals, in accordance with instructions supplied by the operator emulation control processor 90.

OPERATION

As pointed out above, because the operator emulation processor 90 of the auxiliary signal processing interface 50 is coupled to each of the operator's display 14, keyboard 16 and audio messaging unit 60, it has the ability to simulate input/output operations that would normally be manually conducted by the operator. Since the operator is not required to (and normally does not) have knowledge of the telecommunication switch's proprietary communication signaling protocol, neither does operator emulation processor 90; its actions are based upon what the operator would normally see and do.

Considering the case of a toll operator workstation as a non-limiting example, the response that is initiated by a toll operator will be dependent upon the specifics of one or more precursor digits dialed by an accessing party. In the case of an "0+" call, for example (where "0" indicates access to the operator and "+" indicates the digits (area code and seven digit number) following the "0"), the greeting phrase spoken by the operator will typically be different from the phrase given for another type of call. Since the call type indication (here "0+") is customarily displayed to the operator at a prescribed spatial region (e.g., upper right portion) of the graphics user interface displayed by the video display monitor 14, the video signal analysis routine executed by processor 140 need only apply video pattern recognition analysis to the contents of that portion of RAM 130 associated with the displayed spatial region of interest (e.g., the upper right portion of the workstation screen).

As another example, in some instances it becomes necessary that a call originally directed to one operator position be forwarded to another workstation. In such an event, the initially intercepting workstation operator must normally become an interactive participant in the call forwarding process—first, by reading the call information displayed by video monitor 14, and then keying-in that information via keyboard 16 to the workstation's data processing unit 12. Not only is additional time involved, but there is potential for human error in reading and entering the displayed information (digits). Advantageously, the ability of the processor 140 to read the displayed video information allows operator position actions that are dependent upon the contents of the displayed information (such as the presentation of a prescribed greeting message to the caller or the entering of call forwarding information, for example) to be automated and without the introduction of errors into the process.

Thus, microprocessor 140 generates an output code representative of its analysis of the captured frame of video data, and forwards this information via video trigger link 74 to operator emulation control processor 90. Processor 90 then processes this video analysis information and any keystroke information supplied by the operator, for the purpose of automating or emulating the operator's response. As described above, such automated response may include the artificial invoking of one or more keystroke—representative signals to the workstation's data processing unit 12 or the generation of a prescribed vocalized message or phrase by the auxiliary audio messaging unit 60.

Where the automated operator response includes invoking one or more keystrokes (as in the case of a call forwarding operation, for example), processor 90 couples output signals over keystroke transmission control link 86 to the keyboard signal processing unit 80, which are used to selectively control the transmission of invoked keystroke signals to the data processing unit 12, in accordance with the analysis of keystroke and video frame data carried out by processor 90. Where the response is to invoke the generation of a prescribed personalized phrase by auxiliary audio messaging unit 60 (such as "directory assistance operator, may I help you?" when a call is received, or "thank you for using the XYZ telephone network" when a call is released), the emulation control processor 90 couples an output signal over the audio response trigger link 57 to the control port 62 of the auxiliary audio messaging unit 60, so that the selected greeting phrase will be synthetically vocalized to the calling party.

In the case of the release of a call, the ability of the auxiliary signal processing interface 50 to selectively control the coupling of keystrokes from the operator's keyboard 16 to the data processing unit 12 is particularly useful, as it not only reduces operator workload, but more efficiently handles release of the call. Normal release of the call is initiated by the operator depressing a call release key on the workstation keyboard, such as may occur when the operator observes that the video monitor shows that the incoming call indication is no longer displayed.

Prior to releasing the call, the operator may either personally speak a "thank you" type phrase to the customer, or manually trigger the auxiliary audio messaging unit 60 to synthetically vocalize the phrase. When the operator has either finished speaking or has listened to the completion of the voicing of the phrase by the auxiliary audio messaging unit 60, the operator then hits the release key on the workstation keyboard, releasing the call. The present invention enables a release operation that employs a synthesized message generated by the auxiliary audio messaging unit 60 to be efficiently executed by the depression of only the release key. Alternatively, a totally automated release operation in which a message is synthesized by the auxiliary audio messaging unit 60 may be executed without any operator intervention. As described previously, automatic release may occur should the operator desire to reject calls from a certain source as determined by on-screen indication of calling number, trunk number, calling location or incoming local phone number, for example.

In the case of the operator releasing the call, since keystrokes from the keyboard 16 are intercepted (coupled to and read) by the microprocessor 160 within the keyboard signal processing unit 80, processor 160 has the ability to controllably delay and modify the contents of the keystrokes. When the release key is invoked, the processor 90 performs two operations: first, it triggers the operation of the auxiliary messaging unit 60 to vocalize the release phrase; second, it causes the keyboard processor 160 to temporarily buffer the release keystroke signal, until it sees a message termination signal sent from the messaging unit 60 upon completion of the phrase. Once the message termination signal has been detected by processor 90 it signals processor 160 to pass the buffered 'release' key signal to the data processing unit 12, so that the call may be released by the switch.

A fully automated release operation may be initiated in response to a change in state of the incoming call present information displayed by monitor 14. When the call information disappears, the video pattern recognition routine executed by processor 140 within video signal processor signals processor 90, indicating that the call has been dropped (by the customer). In response to this recognition, processor 90 signals the processor 160 within keyboard signal processing unit 80 to generate a pseudo keystroke, which is then transmitted to the data processing unit 12, so that the call may be released by the switch.

As described above, the auxiliary signal processing interface 50 is configured to be coupled to an ancillary data base 67, in which telephone subscriber information, such as directory assistance telephone subscriber information, may be stored. Because video signal analysis processor 140 and operator emulation control processor 90 have a priori knowledge of various messages/prompts that are displayable by the workstation's monitor 14, the information is used to vector a search engine executed by processor 90 to automatically retrieve stored information.

For this purpose, the auxiliary signal processing interface 50 includes a serial port/LAN interface 95 is coupled over a bidirectional bus 96 to operator emulation control processor 90 and via digital communications port 63 to ancillary data base or auxiliary function processor 67. For the non-limiting case of a call coming to a 911 emergency service operator, the operator's auxiliary processing interface captures the calling number off the video screen and forwards that number in a database query request over the auxiliary bidirectional bus 65 to the auxiliary database 67. A returned database entry may include the telephone numbers of the police and fire departments of the person calling for emergency help. The interface may also selectively key the police number into the workstation keyboard and effect a transfer of the caller to the local police department.

The auxiliary bidirectional bus 65 is typically connected to "friendly" external service suppliers, and may have a proprietary data structure. Such suppliers may also provide proprietary information to connect their equipment, as such information may not be available on the video screen 14 or through the workstation keyboard 16. This connection may be directly connected to the attached unit. It may be noted that this does not preclude the access of external databases through the DXL 27, provided that the database is "available" through the workstation's video screen 14 and keyboard 16.

As will be appreciated from the foregoing description, the apparent inability to automate a personal computer-based operator workstation without access to or knowledge of the communication protocol of the telecommunication switch is effectively remedied in accordance with the invention, which is based upon what the operator would normally see and do, rather than on signals from the switch. Since it is ported to readily accessible signal transport paths of input/output devices of the telephone operator's personal computer-based workstation, the auxiliary signal processing interface of the invention is able to intercept, analyze and selectively modify signals that are transported between input/output components and the data processing unit of the workstation, and thus has the ability to simulate input/output operations that would normally be manually conducted by the operator.

While we have shown and described an embodiment in accordance with the present invention, it is to be understood that the same is not limited thereto but is susceptible to numerous changes and modifications as are known to a person skilled in the art, and we therefore do not wish to be limited to the details shown and described herein, but intend to cover all such changes and modifications as are obvious to one of ordinary skill in the art.

What is claimed is:

1. A signal processing interface adapted for use with a computer-based, telecommunication system operator workstation having a data processing unit, one or more input devices through which control signals may be provided to said data processing unit by said operator, and a display device that is operative to display information associated with results of data processing operations carried out by said data processing unit to said operator, said data processing unit being operative to execute an operator position application program which processes signals supplied thereto, including said control signals, and communication signals from a telecommunication system source, external to said workstation, having a communication signaling protocol, said signal processing interface comprising:

a plurality of signaling ports coupled to signaling paths through which said one or more input devices and said display device communicate with said data processing unit; and a signal processing unit coupled to said plurality of signaling ports, and being operative, without requiring knowledge of said communication signaling protocol, to conduct a comparison of signals coupled to said display device, that are representative of said information associated with results of data processing operations carried out by said data processing unit, with one or more information templates associated with prescribed operator position actions, and, in response to said comparison, to automatically cause said workstation to execute one or more operator position actions in place of said operator, which one or more operator position actions would otherwise be initiated by said operator in response to said information displayed by said display device.

2. The signal processing interface according to claim 1, wherein said signal processing unit is further operative to automatically cause said workstation to generate at least one synthesized voice message for delivery to an audio device of said telecommunication system external to said workstation, in response to said comparison of signals coupled to said display device that are representative of said information associated with results of data processing operations carried out by said data processing unit.

3. The signal processing interface according to claim 1, wherein said one or more input devices includes a keyboard, and wherein said signal processing unit is further operative to analyze keystroke representative signals generated by operation of one or more keys of said keyboard by said operator, and to automatically cause said workstation to execute one or more operator position actions, that would otherwise be initiated by said operator, in accordance with said comparison of one or more of signals coupled to said display device representative of said information associated with results of data processing operations carried out by said data processing unit, and analysis of said keystroke representative signals.

4. The signal processing interface according to claim 3, wherein said signal processing unit operative to automatically cause said workstation to generate at least one synthesized voice message for delivery to an audio device of said telecommunication system external to said workstation, in response to said comparison of at least one of signals coupled to said display device representative of said information associated with results of data processing operations carried out by said data processing unit and said analysis of said keystroke representative signals.

5. The signal processing interface according to claim 1, wherein said one or more input/output devices include at least one of a keyboard, a mouse and a wand, and wherein said signal processing unit is further operative to analyze signals as generated by operation of said at least one of a keyboard, a mouse and a wand by said operator, and to automatically cause said workstation to execute one or more operator position actions, that would otherwise be initiated by said operator, in accordance with said comparison of one or more of signals coupled to said display device representative of said information associated with results of data processing operations carried out by said data processing unit, and analysis of said signals as generated by operation of said at least one of a keyboard, a mouse and a wand by said operator.

6. The signal processing interface according to claim 1, wherein said one or more input devices includes a keyboard, and wherein said signal processing unit is operative, in response to said comparison of signals coupled to said display device representative of said information associated with results of data processing operations carried out by said data processing unit, to generate a pseudo keystroke signal that simulates a keystroke signal from said keyboard as though generated by said operator, and to couple said pseudo keystroke signal to said data processing unit, so as to automatically cause said workstation to execute one or more actions, that would otherwise be initiated by said operator operating said keyboard based upon said information displayed by said display device.

7. A method of controlling the operation of a computer-based, telecommunication system operator workstation having a data processing unit, one or more input devices through which control signals may be provided to said data processing unit by said operator, and a display device that is operative to display information associated with results of data processing operations carried out by said data processing unit to said operator, said data processing unit being operative to execute an operator position application program which processes signals supplied thereto, including said control signals, and communication signals from a telecommunication system source, external to said workstation, having a communication signaling protocol, said method comprising the steps of:

(a) conducting a comparison, without requiring knowledge of said communication signaling protocol, of signals that are coupled to said display device and are representative of said information associated with results of data processing operations carried out by said data processing unit, with one or more information templates associated with prescribed operator position actions; and (b) in response to said comparison conducted in step (a), automatically causing said workstation to execute one or more operator position actions in place of said operator, which one or more operator position actions would otherwise be initiated by said operator in response to said operator perceiving said information displayed by said display device.

8. The method according to claim 7, wherein step (b) further includes automatically causing said workstation to generate at least one synthesized voice message for delivery to an audio device of said telecommunication system external to said workstation, in response to said comparison of signals coupled to said display device that are representative of said information associated with results of data processing operations carried out by said data processing unit.

9. The method according to claim 7, wherein said one or more input/output devices includes a keyboard, and wherein step (b) further includes analyzing keystroke representative signals generated by operation of one or more keys of said keyboard by said operator, and automatically causing said workstation to execute one or more operator position actions, that would otherwise be initiated by said operator, in accordance with said comparison of one or more of signals coupled to said display device representative of said information associated with results of data processing operations carried out by said data processing unit, and analysis of said keystroke representative signals.

10. The method according to claim 9, wherein step (b) further includes automatically causing said workstation to generate at least one synthesized voice message for delivery to an audio device of said telecommunication system external to said workstation, in response to said comparison of at least one of signals coupled to said display device representative of said information associated with results of data processing operations carried out by said data processing unit and said analysis of said keystroke representative signals.

11. The method according to claim 7, wherein said one or more input/output devices include at least one of a keyboard, a mouse and a wand, and wherein step (b) further includes analyzing signals generated by operation of said at least one of a keyboard, a mouse and a wand by said operator, and automatically causing said workstation to execute one or more operator position actions, that would otherwise be initiated by said operator, in accordance with said comparison of one or more of signals coupled to said display device representative of said information associated with results of data processing operations carried out by said data processing unit, and analysis of said signals as generated by operation of said at least one of a keyboard, a mouse and a wand by said operator.

12. The method according to claim 7, wherein said one or more input devices includes a keyboard, and wherein step (b) further includes, in response to said comparison of signals coupled to said display device representative of said information associated with results of data processing operations carried out by said data processing unit, generating a pseudo keystroke signal that simulates a keystroke signal from said keyboard as though generated by said operator, and coupling said pseudo keystroke signal to said data processing unit, so as to automatically cause said workstation to execute one or more actions, that would otherwise be initiated by said operator operating said keyboard based upon said information displayed by said display device.

13. A method of operating of a telecommunication system operator workstation having a data processing unit, one or more input devices through which control signals may be provided to said data processing unit by said operator, and an information presentation device that is operative to present to said operator information associated with results of data processing operations carried out by said data processing unit, said data processing unit being operative to execute an operator position application program which processes signals supplied thereto, including said control signals, and communication signals from a telecommunication system source, external to said workstation, having a communication signaling protocol, said method comprising the steps of:

(a) conducting an analysis, without requiring knowledge of said communication signaling protocol, of signals coupled to said information presentation device that are representative of said information associated with said results of data processing operations carried out by said data processing unit, and reaching a determination, from said analysis, of one or more prescribed operator position actions to be carried out by said operator; and (b) in response to said analysis and determination carried out in step (a), automatically causing said workstation to execute said one or more operator position actions in place of said operator, which one or more operator position actions would otherwise be initiated by said operator in response to said operator perceiving said information presented to said operator by said information presentation device.

14. The method according to claim 13, wherein said information presentation device comprises a display device, and wherein step (b) comprises, in response to said analysis and determination carried out in step (a), automatically causing said workstation to execute said one or more operator position actions in place of said operator, which one or more operator position actions would otherwise be initiated by said operator in response to said operator perceiving information displayed by said display device.

15. The method according to claim 13, wherein step (b) further includes automatically causing said workstation to generate at least one synthesized voice message, for delivery to an audio device of said telecommunication system external to said workstation, in response to said analysis and determination carried out in step (a).

16. The method according to claim 14, wherein said one or more input/output devices includes a keyboard, and wherein step (b) further includes analyzing keystroke representative signals generated by operation of one or more keys of said keyboard by said operator, and automatically causing said workstation to execute one or more operator position actions, that would otherwise be initiated by said operator, in accordance with said analysis and determination of one or more of signals coupled to said display device representative of said information associated with results of data processing operations carried out by said data processing unit, and analysis of said keystroke representative signals.

17. The method according to claim 16, wherein step (b) further includes automatically causing said workstation to generate at least one synthesized voice message for delivery to an audio device of said telecommunication system external to said workstation, in response to said analysis and determination of at least one of signals coupled to said display device representative of said information associated with results of data processing operations carried out by said data processing unit and said analysis of said keystroke representative signals.

18. The method according to claim 13, wherein said one or more input/output devices include at least one of a keyboard, a mouse and a wand, and wherein step (b) further includes analyzing signals generated by operation of said at least one of a keyboard, a mouse and a wand by said operator, and automatically causing said workstation to execute one or more operator position actions, that would otherwise be initiated by said operator, in accordance with said analysis and determinatin of one or more of signals coupled to said information presentation device representative of said information associated with results of data processing operations carried out by said data processing unit, and analysis of said signals as generated by operation of said at least one of a keyboard, a mouse and a wand by said operator.

19. The method according to claim 13, wherein said one or more input devices includes a keyboard, and wherein step (b) further includes, in response to said analysis and determination of signals coupled to said information presentation device representative of said information associated with results of data processing operations carried out by said data processing unit, generating a pseudo keystroke signal that simulates a keystroke signal from said keyboard as though generated by said operator, and coupling said pseudo keystroke signal to said data processing unit, so as to automatically cause said workstation to execute one or more actions, that would otherwise be initiated by said operator operating said keyboard based upon said information presented by said information presentation device.

\* \* \* \* \*